Sept. 27, 1932.   W. D. ANDERSON   1,879,006
SWIVEL FERRULE STRAP SOCKET
Filed Feb. 10, 1930
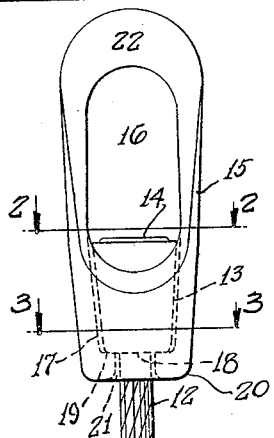
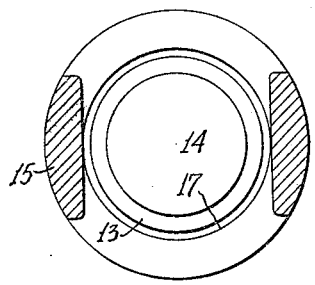
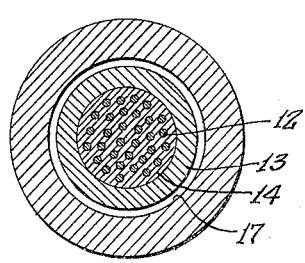
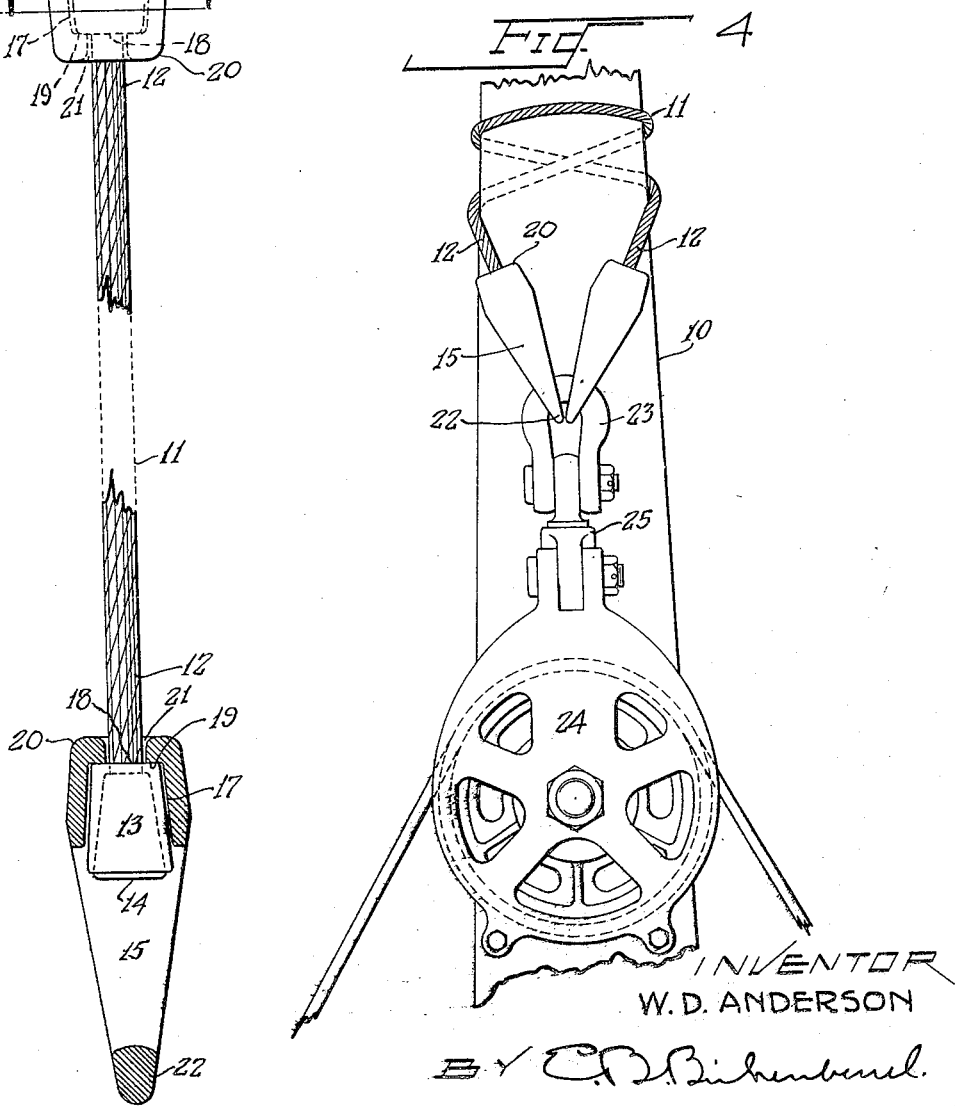
INVENTOR
W. D. ANDERSON
ATTORNEY Patented Sept. 27, 1932

1,879,006

UNITED STATES PATENT OFFICE

WILLIAM D. ANDERSON, OF SAN FRANCISCO, CALIFORNIA

SWIVEL FERRULE STRAP SOCKET

Application filed February 10, 1930. Serial No. 427,409.

This invention relates generally to the logging industry, and particularly to swivel ferrule strap sockets.

The main object of this invention is to provide a novel form of socket for the ends of a strap such as is used on a spar tree or mast to support a block, without making it necessary to employ an additional swivel as is the case when an ordinary cable socket is used.

The second object is to allow free play for the wire rope of which the strap is formed in order that there shall be no twisting strains between the socket and rope.

The third object is to provide easy access for the babbitting of the wire rope into place, which is ordinarily rendered more difficult when the individual wires of the rope have to be crimped or turned over before babbitting.

The fourth object is to economize on cables by eliminating the need of eye splices.

Before entering into an explanation of this invention it is stated that same refers to the use of a steel cable ranging from one and a half inches to two inches in diameter and naturally quite rigid which is referred to as a strap, and in logging operations is passed around the spar three for the purpose of hanging a heavy logging block therefrom. It will be borne in mind that this rigging must be put into place by a rigger who is suspended by a life line and holds himself in place by spurs. If the strap had ordinary nonswiveling sockets on its ends, or if it merely had eye splices formed thereon, the rigger would be forced to employ a lever or bar to twist the sockets into line in order to insert the shackle.

In the socket which I am about to describe the connection to the strap is made rotatable by hand, thereby eliminating a very dangerous operation for the high rigger.

The above results are accomplished in the following specification as illustrated in the accompanying drawing, in which:

Figure 1 is a side view of a strap with the socket attached to each end thereof.

Figure 2 is a section taken along the line 2—2 in Figure 1.

Figure 3 is a section taken along the line 3—3 in Figure 1.

Figure 4 is a fragmentary view of a spar tree showing the strap in place and a block suspended therefrom.

Similar numbers of reference refer to similar parts throughout the several views.

Referring in detail to the drawing, there is shown a spar tree 10 around which is wrapped the middle portion of a strap 11 to each of whose ends 12 is attached a ferrule 13, preferably by means of babbitt 14, as is the customary practice. The ferrule 13 is slightly tapering with its enlarged end outermost.

Referring particularly to the socket it will be seen to consist of a somewhat elongated body member 15 having an opening 16 along one end thereof and a tapering recess 17 at its opposite end adapted to receive the ferrule 13 with sufficient clearance to permit said ferrule to rotate freely within the socket. The end 18 of the ferrule 13 bears against the shoulder 19 of the recess 17. The end 20 of the body 15 is provided with an opening 21 through which can freely pass the strap ends 12.

When the strap 11 has been given one full wrap around the spar 10 and the closed ends 22 of the body 15 brought together (as shown in Figure 4) a shackle 23 is passed through both of the openings 16 and a block 24 suspended therefrom. It is understood that the block 24 may be several times the weight of the rigger himself and it is drawn up into position by means of a temporary block and line operated from the ground, usually by a cable-winding engine.

It can readily be seen that the seemingly simple operation of bringing the ends 22 of the shackle into the position shown in Figure 4 would become many times more difficult if the strap ends 12 were non-rotatably attached to the shackle. Not only is it possible to expedite the placing of the strap upon a spar and its removal therefrom but also the task of renewing the strap is rendered much easier, due to the fact that the ferrules 13 can be slipped out of their recesses 17 and then passed to one side or the other of the closed end 22 through the opening 16, after which the ferrule end can be heated to melt out the babbitt. Otherwise, if the strap end 12 were babbitted directly into the socket without the use of a ferrule, or without the use of a non-rotatable ferrule, it would be necessary to heat the socket itself, which is obviously undesirable when castings of special alloys are employed.

It is a well understood fact that the blocks 24 are joined to the shackles 23 by means of a swivel coupling 25 such as is now in common use.

I claim:

1. A swivel ferrule strap socket consisting of a cylindrical body member having one end thereof pointed, an eye formed transversely through said pointed end, the cylindrical end of said socket having a recess therein communicating with said eye, and an opening in the cylindrical end of said socket smaller in diameter than said recess and communicating therewith.

2. A strap for mounting logging blocks on spar trees consisting of a length of wire rope in combination with a pair of swivel sockets each of which has an opening formed in one end thereof to receive an end of said rope, each of said ends having a ferrule secured thereon, each of said sockets having a recess formed therein adapted to freely and rotatably receive its respective ferrule, each of said sockets having the outer end thereof pointed and transversely apertured for the reception of a shackle member.

WILLIAM D. ANDERSON.